United States Patent Office 3,436,273
Patented Apr. 1, 1969

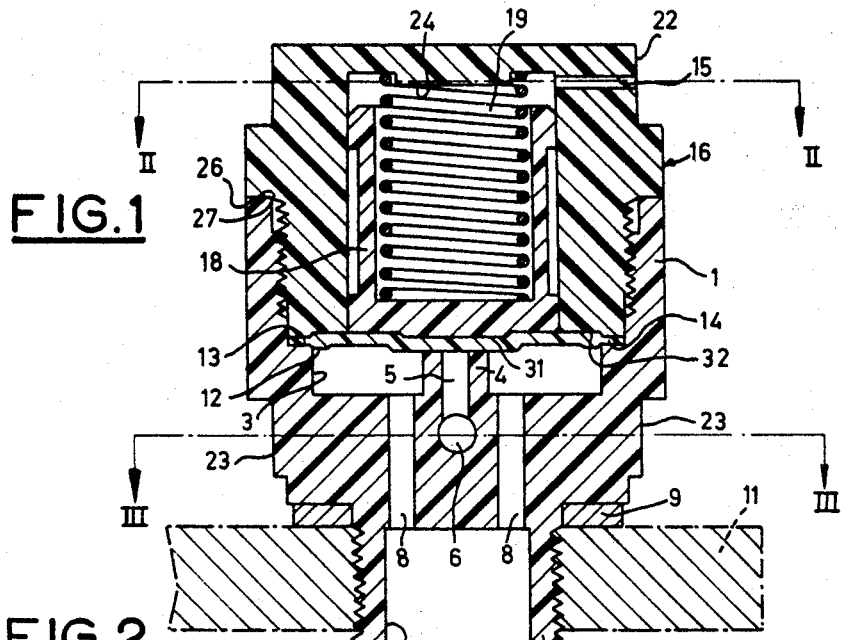
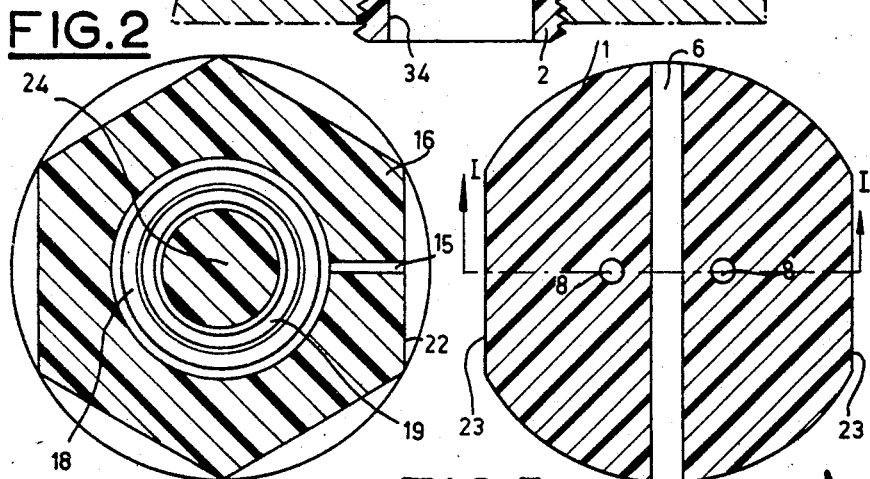
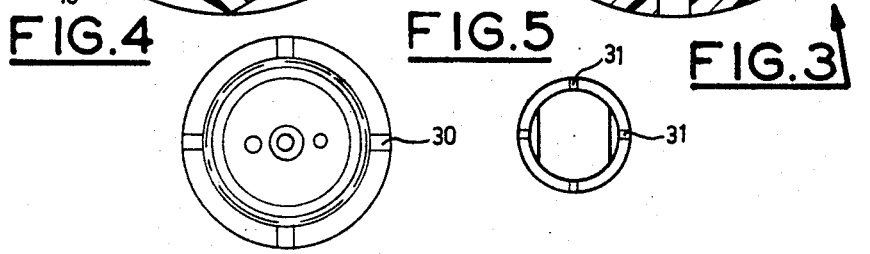
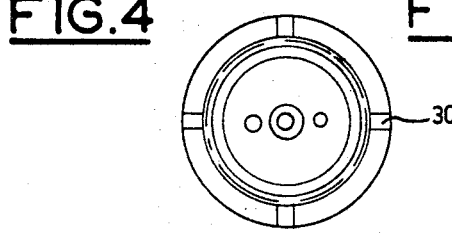

3,436,273
SAFETY VALVE INTENDED MAINLY FOR
ELECTRIC BATTERIES
Jean Louis Gratzmuller, 4 Rue Maryse Hilas,
Levallois, France
Filed July 19, 1966, Ser. No. 566,348
Claims priority, application France, July 22, 1965,
25,564
Int. Cl. H01m 1/06
U.S. Cl. 136—178         13 Claims

ABSTRACT OF THE DISCLOSURE

A battery pressure cap comprising a first hollow body having a threaded upper portion and a bottom having a radial inwardly extending peripheral portion and a threaded lower extremity adapted to screw in a threaded opening in a battery, and having an inner chamber with a valve seat, said seat having an axial channel communicating with the outside and at least one longitudinal channel connecting therewith and communicating with the inside of the battery, said seat extending on a level approximately even with said peripheral portion; a hollow cover having a lower threaded portion adapted to engage the upper threaded portion of said hollow body the respective threads being of opposite direction; a channel in said cover communicating with the exterior, a hollow membrane guide slidingly mounted in said cover housing a return spring therein, one end of said spring bearing against said housing and the other end bearing against said cover a membrane mounted on said seat and having edges secured between corresponding surfaces of said cover and said body, said membrane guide urging said membrane against said seat, and a vent chamber defined by said valve seat, said inwardly peripheral portion and said seat.

---

The present invention has for its object a safety valve intended mainly for electric batteries.

It is known that electric batteries at the end of their charge and in case of over-charge evolve gases, generally a mixture of hydrogen and oxygen coming from the decomposition of water, and that these gases must be liberated in the atmosphere. Additionally, it is important to provide batteries which can be turned upside down momentarily or even for a prolonged period, for example during their transport, without the escape of their electrolyte.

One solution for this problem consists in permitting the inside of the battery vat to communicate with the atmosphere only when the internal pressure in the battery is greater than the atmospheric pressure by a predetermined value and by means of a safety valve inserted in the place of a conventional filler cap.

One of the main difficulties of the problem resides in the provision of a safety valve having a very small volume since the filler cap is generally positioned between the two positive and negative terminals of the battery.

A second difficulty resides in the fact that the safety valve must open infallibly at an internal pressure figure for the battery which is less than a maximum predetermined value and must close again with perfect tightness at a value greater than a predetermined minimum value. In fact, these maximum and minimum values of the pressure must be respected in order to take into account the rather low mechanical resistance of the cell jar, the desirability of not complicating the problem of the water-tight passage of the terminals through the walls of the cell jar, as well as variations in the internal temperature of the battery and of atmospheric pressure. The valves for example must open under a maximum pressure of the order of 800 millibars above atmospheric pressure and must close again tightly under a minimum pressure of 300 millibars above atmospheric pressure, regardless of the time and place considered.

A third difficulty resides in the fact that the valve must be capable of functioning correctly in a very wide range of temperatures, for example from $-40°$ C. to $+70°$ C.

A valve of such precision, with fool-proof water-tight closure, cannot effectively be obtained unless its motor organ is formed by a mobile partition balanced by a spring, the active surface of the partition (that is, the surface in communication with the cell jar) being at least ten times greater than the surface blocking off the valve seat. In effect, the valve must remain closed for long periods so that the partition risks to remain glued on its seat and the mobile partition must be able to exert sufficient pressure to un-stick itself before the predetermined maximum opening pressure is reached.

Finally, the lowest cost price possible is always sought, which further increases these problems.

A safety valve which already fulfills some of the operating conditions required is that described and shown in the same inventor's French Patent No. 989,774 of Apr. 28, 1949, for "Improvements in Safety Valves."

The claimed safety valve comprises a body having a threaded mouth and having a chamber with an annular seat the inside of which is linked with conduits communicating with the atmosphere, and the outside of which is linked with conduits which end up in the end of said mouth in order to communicate with the inside of the apparatus in which this valve body must be screwed, while a valve integral with a supple membrane having an active surface much greater than said valve and maintained in the body by means of its periphery, is urged against the said seat under the action of the return spring by means of a membrane guide slidingly mounted in a cover secured on the body.

The invention aims firstly at the combination of a battery with a safety valve of the type above described.

It aims also at an entire series of improvements of said valve adapted to improve the performance thereof, to increase its safety, to reduce its volume, to facilitate the assembly thereof and its assembly on the battery, to facilitate its upkeep and to reduce its cost price.

All the above improvements will be set forth in the following description and annexed drawings which show by way of non-limiting example one embodiment of such a safety valve.

In the drawings:

FIGURE 1 is a longitudinal cross-section of the assembly of the safety valve taken along line I—I of FIGURE 3, and FIGURES 2 and 3 are transverse cross-sectional views taken respectively along lines II—II and III—III of FIGURE 1.

FIGURE 4 is a bottom end view of a safety valve having alternate grasping means on the body portion.

FIGURE 5 is a top end view of a safety valve having alternate grasping means on the cover portion.

The safety valve comprises a body 1 which is provided with a threaded mouth 2 and which has a chamber 3 with an annular seat 4 the inside of which is linked to an axial conduit 5 which issues into a transversal conduit 6 open to the atmosphere and the outside of which is connected with longitudinal conduits 8 which issue into the end of the threaded mouth 2 in such a way as to communicate with the interior of the cell jar 11 on which the valve is mounted, with the interposition of a water-tight packing 9.

The valve is formed by the central part of the supple membrane 12 which is gripped only along its periphery between an annular shoulder 13 and the annular surface of the end 14 of the cover 16 screwed into body 1 the cover having a vent 15. The active surface of the part of the membrane located in chamber 3 outside seat 4 is preferably at least of the order of ten times greater than the surface of the central part forming the valve seat. The membrane is urged towards the seat by means of a guide 18 under the action of a return spring 19 bearing against the bottom of cover 16.

The thread linking the cover and the body is a female thread in the body which permits to position the vent holes 6 near the level of the seat while reducing the total height.

In view of the small value of the adjustment pressure, the small outer diameter which is possible, and the small total height sought while keeping a spring sufficiently elastic and balancing the push of the gases on the membrane, the membrane guide 18 is provided in the shape of a hollow piece which contains almost entirely return spring 19. Preferably this guide is formed of a material which adsorbs less moisture than the material of which the cover is made so as to avoid jamming between the two when these dilate.

When during maintenance of the battery, it is necessary to clean the valve, the valve must be removed; however, it has been noted that nearly always the threaded mouth of the body is stuck in the threaded hole of the jar and that the joint is stuck to the two pieces in such a way that when one tries to unscrew the valve by turning the cover which is the only accessible part of the assembly between the terminals of the battery it is noted that the cover unscrews from the body while the latter remains in place. For this reason according to an important feature of the invention, the threading of the cover 16 and the threading of the mouth 2 have threads of opposite direction, preferably the thread of the mouth is a right-hand thread and that of the cover a left-hand thread. The upper part of the cover 16 has a hexagonal configuration 22 which is readily accessible by means of which the safety valve assembly can be unscrewed since the effort exerted for that purpose tends to tighten the cover in the body. During assembly of the safety valve on the battery there is no difficulty first because there is no abnormal effort due to the adherence to be overcome and afterwards because there can be used dynamometric keys adjusted to a tightening torque on the jar cell which is less than the torque required to unscrew the cover alone.

In order that during assembly of the safety valve itself, it might be possible to strongly block the cover in the body, the latter has two flat sections 23 which permit grasping it very solidly.

If the thread of the return spring were in the same direction as that of the cover thread it would be noted that the spring arches while the cover is screwed into the body which is not desired. For that reason according to another characteristic the thread of the spring is opposite the securing thread of the cover in the body.

Furthermore it has been noted that when the upper inside surface of cover 16 is uniformly plane along all its area, the coil of the return spring sometimes hooks between the upper edge of membrane guide 18 which evidently completely destroys the precision of the adjustment of the valve. To avoid this drawback, the inside bottom of the cover has been provided with a centering boss 24 for a corresponding end of the spring. Thus the spring can no longer hook on or even rub against the wall of the membrane guide 18.

In order that the functioning of the valve be very sensitive and very precise, it is important that membrane 12 should not be subjected to stresses other than those transmitted thereto by guide 18 and its seat 4. To this effect the membrane is maintained in the body only by the marginal part of its periphery between shoulders 13 of the body and annular edge 14 of the cover with a tightening pressure well determined which is obtained by the relative axial position of the two holding surfaces when one surface of the annular shoulder 26 of the cover is in contact with a complementary annular surface 27 of the body during tightening of the cover of the body.

In order to improve the behaviour of the valve and of the membrane and especially to improve the closing function of the valve and the function of simple supple support of the membrane, the supple part of the circular bearing surface of the membrane guide against the membrane is slightly in the form of a projection with respect to the rest of the surface as shown at 31 and the annular part of the inner end of the cover which is located immediately inside the gripping part of the membrane is slightly recessed with respect to this part as indicated by 32.

Since the body can be made economically of any suitable plastic material there is provided in the end of the threaded mouth 2 a deep chamber 34 into which issue conduits 8 of the pressure uptake in order that the pins of the mould intended to form these conduits can be much shorter than if this chamber did not exist.

As raw material for making the body and the cover and possibly the membrane guide there can advantageously be used super polyamides in particular those known by the name nylon and for the membrane a different very supple plastic material such as a silicone.

It has been noted in fact that if there is used an elastomeric membrane made of Perbunan or neoprene, it is necessary to give it a greater thickness, the thickness tolerances are greater and the force with which the valve sticks to its seat is greater than if there is used a silicone membrane and more particularly a special silicone which withstand the action of concentrated potassium hydroxide. Thus for example under the same operating conditions it has been noted that the effort for unsticking a neoprene elastomeric valve on a seat of Rilsan (super polyamide type 11) or of nylon are 125 and 350 millibars respectively, while with a silicone valve, the effort is only 60 millibars against a nylon seat.

Finally the properties of the membrane are preserved if the same is dampened during its assembly with a silicone grease.

The securing of the cover on the base is further improved by interposing between these two members during their assembly a suitable glue.

As shown in FIGURE 4, it is possible to replace flat sections 23 shown in FIGURES 1 and 3 by four opposite grooves 30. Also, and as shown in FIGURE 5, it is possible to provide in the lower periphery of cover 16 axial slots or ribs 31, instead of giving it the hexagonal shape shown in FIGURES 1 and 2. These grooves, ribs or slots permit easy grasping.

It will be understood that the invention is not limited to an embodiment described and shown which has been given by way of example. There can be made various modifications therein according to the uses envisaged without departing from the scope of the invention.

What is claimed is:

1. A safety valve for protecting an apparatus against an overpressure of gas comprising in combination a body and a vented cover for said body screwed on said body, said body having a lower threaded mouth adapted to be screwed onto the apparatus to be protected, said body further having an annular valve seat and a supple silicone membrane; said membrane having peripheral edges held only between corresponding surfaces of said cover and said body, a spring biasing said membrane against said valve seat to obturate said seat under normal conditions, said valve seat defining on said membrane an upstream portion and a downstream portion with respect to the flow of gas during its escape, a first channel adapted to put the upstream portion of the membrane into communication with the apparatus to be protected, and a second channel adapted to put the downstream portion of the membrane into communication with the atmosphere, the direction of the threads connecting the cover to the body being opposite to the direction of the thread on said mouth for connecting the body to the apparatus to be protected, with a hollow membrane guide slidably mounted in the cover and containing the major portion of said spring, said spring engaging both the cover and said membrane guide and urging said membrane guide against said membrane; said membrane having an active surface at least ten times greater than the surface of said valve seat.

2. A safety valve according to claim 1, in which the spring is a helical spring, the direction of the coils thereof being opposite to the direction of the threads connecting said cover to said body.

3. A safety valve according to claim 2, wherein said guide is formed of a material which is less moisture-absorbent than the material of which said cover is made so as to avoid jamming thereof as a result of dilatation.

4. A safety valve according to claim 1, in which said membrane guide has a central projecting surface and the lower part of the cover is recessed.

5. A safety valve according to claim 1, in which said membrane guide is provided with a projection on its portion which is urged against the membrane, the projection being aligned with the valve seat, and the cover is provided with a recess in which fits a portion of the membrane adjacent to its peripheral portion.

6. A safety valve according to claim 1, in which the mouth of said body is hollow thereby forming a first chamber, said chamber being positioned so as to communicate with the apparatus to be protected when the said safety valve is mounted on the apparatus, there being a second chamber below said membrane, a first channel interconnecting these two chambers.

7. A safety valve according to claim 1, in which said body and said cover are made of a superpolyamide.

8. A safety valve according to claim 1, in which the said membrane is made of silicone.

9. A safety valve according to claim 1, in which a silicone grease is applied to the membrane.

10. A safety valve according to claim 1, in which the said membrane guide is made of a superpolyamide, and the membrane is of silicone.

11. A safety valve according to claim 1, in which a glue is applied between said cover and said body to help secure these two parts together.

12. A safety valve according to claim 1, in which the threaded portion of the cover interconnecting with corresponding threaded portion of the body is a male portion, and the corresponding threaded portion of the body is a female portion.

13. A safety valve according to claim 1, in which both the cover and the body are provided with flat sections facilitating the gripping of each of these two parts during screwing.

References Cited

UNITED STATES PATENTS 2,654,559   10/1953   Franck _____ 251—335 XR

FOREIGN PATENTS 989,774   9/1951   France.
424,102   2/1935   Great Britain.

WINSTON A. DOUGLAS, *Primary Examiner.*

DONALD L. WALTON, *Assistant Examiner.*

U.S. Cl. X.R.

137—536